United States Patent

[11] 3,628,467

[72] Inventor David A. Stout
 New Milford, Conn.
[21] Appl. No. 229
[22] Filed Jan. 2, 1970
[45] Patented Dec. 21, 1971
[73] Assignee Universal Oil Products Company
 Des Plaines, Ill.

[54] PALLET RESTRAINING SYSTEM
 4 Claims, 5 Drawing Figs.

[52] U.S. Cl. .................................................... 105/369 A,
 248/361 A
[51] Int. Cl. ..................................................... B60p 7/10,
 B61d 45/00
[50] Field of Search ............................................ 105/366,
 368 T, 369 A; 248/119, 361 A; 280/179 A;
 244/118, 137

[56] References Cited
 UNITED STATES PATENTS

| | | | |
|---|---|---|---|
| 2,743,684 | 5/1956 | Elsner .......................... | 105/369 A |
| 3,210,038 | 10/1965 | Bader et al. ................... | 105/369 A |
| 3,212,457 | 10/1965 | Looker ......................... | 105/369 A |
| 3,312,181 | 4/1967 | Davidson ...................... | 105/369 A |

*Primary Examiner*—Drayton E. Hoffman
*Attorneys*—James R. Hoatson, Jr. and Phillip T. Liggett ABSTRACT: A cargo restraining system for holding down cargo to a pallet and then to a vehicle floor utilizing novel tiedown adapters that have special load transferring capabilities. The system utilizes a pallet which has slotted "holddown" track sections adjacent the edges. Nets or other forms of cargo holding means are attached to the tiedown adapters which in turn are locked into the slotted track section adjacent the pallet locks. Each adapter has a load transferring portion extending between the pallet lock and the top of the pallet. The load transferring capability of the system is manifested when the vehicle is subjected to deceleration forces. At certain deceleration loads the pallet will lift and the load transferring portions of the tiedown adapters will abut the pallet locks, thus transferring some of the load away from the stud fittings and slotted track through the load transferring portions of the tiedown adapters, through the edge portions of the pallet, and through the pallet locks to the vehicle floor.

INVENTOR:
David A. Stout

BY: James R. Hoatson, Jr.
Philip T. Liggett
ATTORNEYS

INVENTOR:
David A. Stout

BY: James R. Hoatson, Jr.
Philip T. Liggett
ATTORNEYS

PALLET RESTRAINING SYSTEM

This invention relates to an improved form of a cargo restraining system for holding down cargo to a pallet and to a vehicle floor.

More particularly, the invention is directed to a cargo restraining system that includes an adapter having a portion that transfers part of the high deceleration loads away from the tiedown fittings of the pallet.

Cargo pallets have been in use for many years for loading cargo into airplanes and land vehicles. Typically, the cargo is placed onto the pallet before being loaded into the vehicle of transport. The cargo is held onto the pallet by means of netting, ropes, straps, etc., which may be tied to the pallet in various manners. Usually, the pallets are maintained in place within the vehicle through the use of pallet locks which are attached to the floor of the vehicle.

With static loads the typical cargo restraining system will adequately maintain the cargo in place on the pallet, and the pallet locks will maintain the pallets in place upon the floor. However, government regulations, particularly for airplane carriers, provide that cargo pallets must be designed so as to sustain loads greater than static loads, that is, loads that would occur under high deceleration or crash conditions.

Typically, "edge cutouts" have been used on pallets in systems subjected to high deceleration loads. The edge cutout is a cutaway portion on the edge of a pallet which has a projection or tongue projecting laterally from the central region of the edge cutout. The tongue is adapted to receive and secure a standard stirrup from the netting or straps that hold down the cargo. The edge cutout is positioned adjacent a pallet lock, and the stirrup, which is shaped to overlap a portion of the edge cutout region, is positioned beneath a pallet lock to thus receive a portion of the load and transfer it to the vehicle floor when the craft decelerates at a high rate. When handling and maneuvering pallets with edge cutouts there is a tendency of catching and damaging the interior fittings of the vehicle or aircraft. The present invention eliminates the use of edge cutouts and the accompanying danger of damaging the vehicle.

Thus, it may be considered a principal object of the present invention to provide for a cargo restraining system for holding down cargo to a pallet and to a vehicle floor which will endure under high loads and especially under high deceleration conditions of the vehicle.

More particularly, it is an object of the present invention to provide a cargo restraining system for holding down cargo to a pallet and to a vehicle floor which utilizes a type of tiedown adapter which has a portion that transfers part of the load away from the actual connection to the pallet during high deceleration conditions.

Broadly, the present invention provides a cargo restraining system for holding down cargo to a pallet and to a vehicle floor which comprises in combination: a cargo pallet removably located on the floor, said cargo pallet having slotted connection means on the upper side and adjacent an edge portion thereof; pallet lock means connected to said floor having a projecting portion overlapping the edge adjacent said slotted connector means and spaced from the upper side of said cargo pallet for maintaining said pallet in place; cargo holding means around said cargo for confining said cargo on said pallet, said cargo holding means having attachment means connected thereto; and, a tiedown adapter adjacent said pallet lock having: stud connector means sized to removably lock-fit within the slotted connection means of said cargo pallet; a load transferring portion extending between the space defined by the projecting portion of said pallet lock means and the upper side of said cargo pallet, and receptacle means for reception of the attachment means of said cargo holding means to thus hold the cargo onto said pallet.

Preferably, the slotted connection means comprises "holddown" track sections which may be of conventional types which are commonly used in aircraft applications. These track sections are usually of a recessed slot or channel form, with each longitudinal section having a continuous undercut slot and a plurality of evenly spaced-apart larger openings which will permit the entry of a suitable stud fitting or other type of track fitting. Of course, the slotted connection means may be spaced-apart track sections that are located only at points adjacent the pallet locks within the aircraft or ground vehicle.

Preferably, the slotted connection means are located at least on two opposing edge portions of the pallets. This is to provide tiedown of the cargo on at least two opposing sides of the pallet. In that case, tiedown adapters would be provided adjacent the pallet locks on both sides.

The receptacle means of the tiedown adapter is typically of a hook-form and the attachment means of the cargo holding means is a stirrup sized to removably fit within the hook-form receptacle. Of course, other conventional forms for tying the cargo holding means to the tiedown adapter is considered to be within the scope of this present improvement. The cargo holding means will generally comprise nets, ropes, straps or other suitable means adapted to be wrapped around the cargo.

Reference to the accompanying diagrammatical drawing and to the following descriptions thereof will serve to better illustrate the construction and arrangement of the present pallet restraining system as well as set forth additional advantages which may be obtained in connection therewith.

FIG. 1 of the drawing is a partial plan view of a cargo restraining system with a pallet having a continuous edge track portion.

Figure 1:
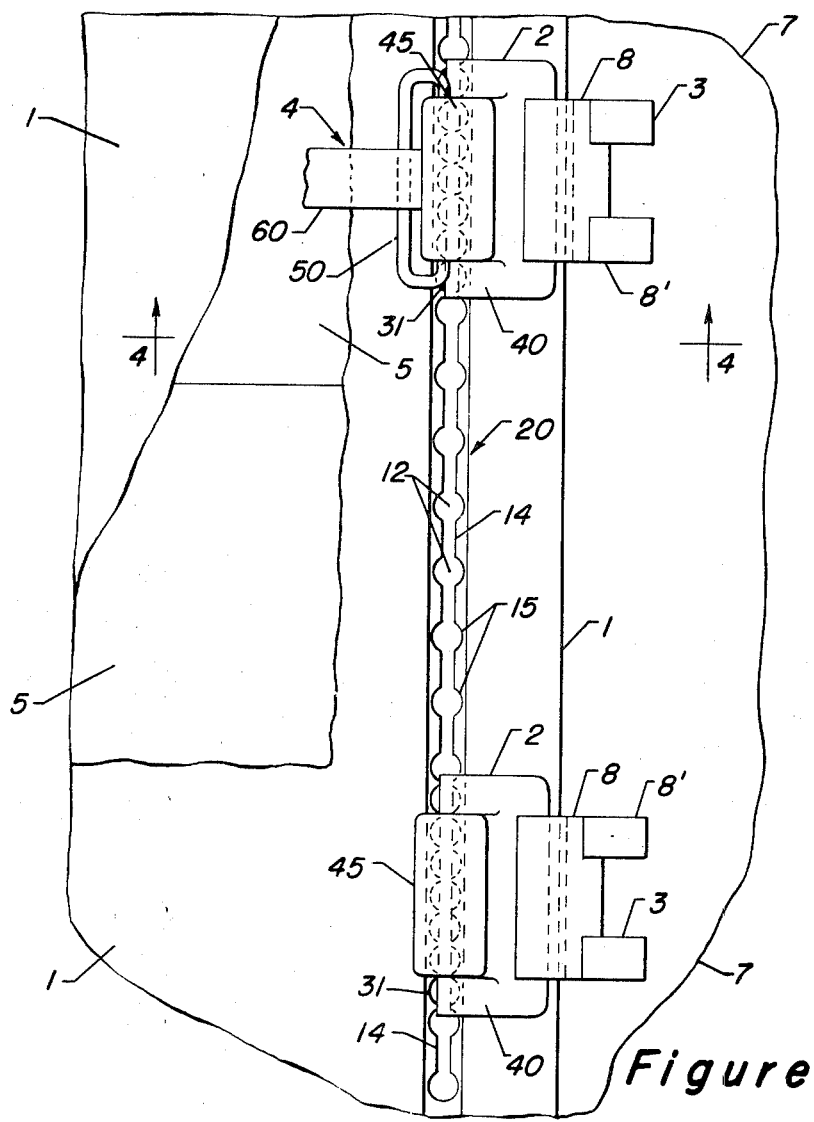
Figure 4:
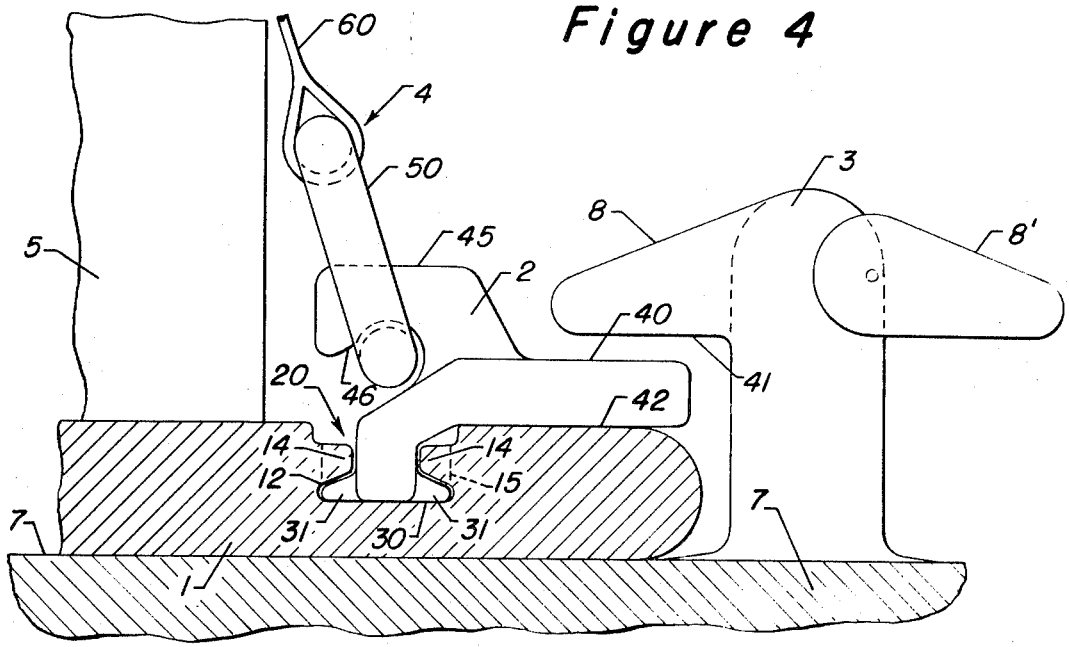
FIG. 4 is an enlarged sectional view of the embodiment of FIG. 1 as taken through line 4—4.

Referring now more particularly to FIGS. 1 and 4 of the drawing, there is shown schematically, a portion of a pallet 1, tiedown adapters 2, pallet lock means 3, a portion of the cargo holding means 4, and a portion of the cargo 5 which is being held in place. The floor of the vehicle to which the pallet is to be placed is represented by numeral 7.

The pallet lock means 3 may be connected to floor 7 in a permanent manner. Pallet lock means 3 may be of a standard pallet lock form that has been heretofore utilized in aircraft cargo carriers. Usually, pallet locks are located in an aircraft or ground vehicle at standard (depending on the type of vehicle) spaced intervals to maintain standard sized pallets in place; for example, one typical cargo restraining system may utilize six pallet locks, three spaced in a row contacting the forward edge of the pallet, and three spaced in a row contacting the rear edge of the pallet. Although the connection to the floor may be rigid, most standard cargo locks are capable of folding into the floor so as to permit storage when not in use. They also are generally rotatable in some way so as to allow them to be rotated into place over a cargo pallet. It is to be noted that the pallet locks of FIGS. 1 and 4 have tongues or projecting portions 8 and 8' which are sized to overlap the edges of the pallets. Projecting portions 8 are shown to overlap pallet 1 and tiedown adapter 2. Projecting portion 8', which would be located adjacent the rear end of a forward pallet, may be rotatable so as to allow it to be rotated over the forward pallet after it is placed under and adjacent to a set of forward pallet locks (not shown).

Cargo pallet 1 has a suitable slotted connection means which may be a slotted "holddown" track 20 on the upper side and adjacent an edge portion of the pallet. As shown here, track 20 is of a conventional form utilized by those in the aircraft as well as other industries. Track section 20 comprises an undercut elongated slot 12 and lip portions 14 adapted to retain the slug connector means which will be described hereinafter. In addition, this preferred type of track section has enlarged openings 15, whereby the enlarged flanged portions of the slug connector means will be permitted to be inserted into slot portion 12 of each track section. Of course, other forms of slotted connection means are contemplated to be within the scope of this present improved pallet retaining system, but the one presented here does establish one that permits disposition of the cargo attachment means at various locations along the edge of the pallet.

Figure 2:
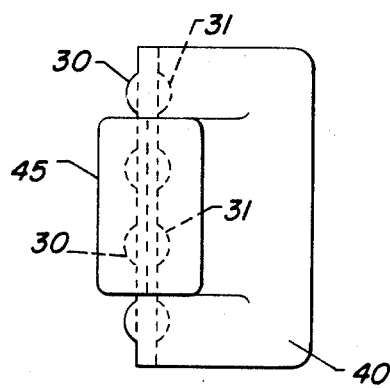
FIG. 2 is a plan view of a typical tiedown adapter as used in the system of FIG. 1.
Figure 3:
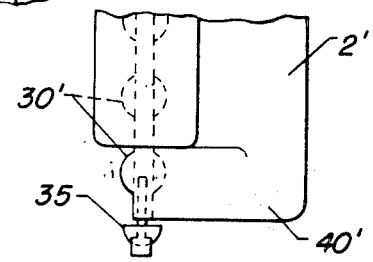
FIG. 3 is a partial plan view of a tiedown adapter which has a plunger lock.

The tiedown adapter 2 is located adjacent each pallet lock means 3. As shown more clearly in FIGS. 2 and 4, each tiedown adapter has fittings or other suitable stud connector means 30 adapted to fit into slot 12 of slotted track 20. Each fitting 30 has a flanged portion 31 sized to slip through openings 15 of slotted track. Once the flanged portions 31 are placed into slot 12, the adapter is moved laterally so that the flanged portion 31 of each fitting abuts the lower part of the lip portion 14 of track 20. In this position, the adapter 2 cannot be pulled from the track 20 in the upward direction. In other words, a lock-fit is established in the upward direction. The type of lock-fit utilized in this system is standard and may be supplemented with shear pins or plunger locks to prevent the adapter from sliding laterally out of lock-fit. FIG. 3 illustrates a schematical representation of an adapter 2' having stud connector means 30' and a retractable shear pin 35. After the adapter 2' is moved laterally in a track section to secure a lock-fit in the upward direction, the shear pin would be lowered into an opening (such as 15 of FIG. 1) adjacent the main body of the adapter. Once pin 35 is inserted into that opening, the adapter cannot be moved in the later direction. A similar shear pin may be located on the opposite side of the adapter 2' to insure that no lateral movement of the adapter would occur. The form of the stud connector means as utilized in the embodiments of FIGS. 1, 2, 4, as well as in FIG. 3 should not be limiting upon this present invention for other suitable stud connector means are contemplated to be within the scope of this improvement. Some limitations in designing such connector means would be availability of standardized tracks and, of course, the load limitations inherent in their configuration. Also, the number of actual fittings 30 and 30', utilized on each adapter 2 and 2', may vary depending on what is deemed practical. Again, load limitations will play a part in determining the number of fittings 30 and 30' required.

The adapter 2 has a load transferring portion 40 which extends between the space defined by the lower portion 41 of tongue 8 of pallet lock means 3 and the upper side 42 of the cargo pallet 1. The load transferring portion 40 plays an important part in this present improvement, and its importance will be set forth in detail hereinafter. The adapter 2 has a third portion, that being a hook-shaped portion or receptacle means 45 which is used for attaching the cargo to the adapter itself. In this particular instance, the receptacle means has an inclined slotted portion 46 which is sized for the positioning of the stirrup 50 of cargo holding means 4. Stirrup 50 is the attachment means that serves to tie down the cargo to the receptacle means 45. The cargo holding means 4 may include ropes, straps, or nets 60, etc. which can be wrapped around the cargo 5 and tied down to the pallet utilizing the tiedown adapter 2 in such a way so as to confine the cargo on the pallet. Of course, the attachment means 50, along with the mating receptacle means 45 is illustrated in its simplest form and it is contemplated that they be of other conventional forms. For instance, conventional self-locking stirrups may well be used in this improved cargo restraining system.

Preferably, another track 20 and other adapters 2 would be located adjacent corresponding pallet locks on the opposing or rear edge of pallet 1. Thus, the cargo could be confined and tied down to both edges of the pallet.

Figure 4A:
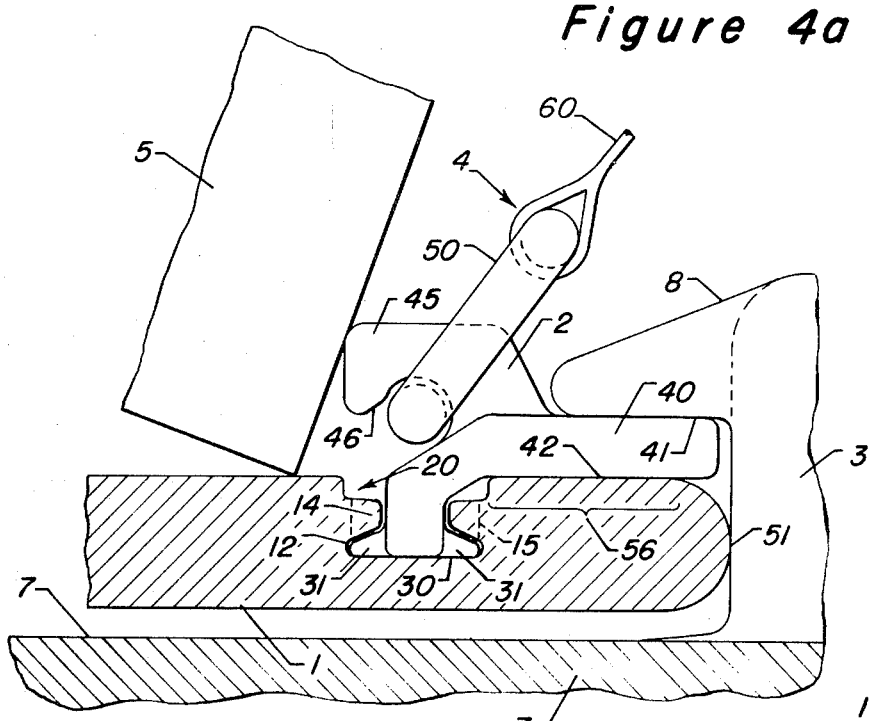
FIG. 4a is the same sectional view as illustrated in FIG. 4, but under decelerating conditions of the vehicle.

The load transferring characteristics of this particular restraining system are manifested when the aircraft or other form of vehicle is subjected to large deceleration loads. A schematical illustration of a portion of the pallet restraining system of FIG. 1 is illustrated in FIG. 4a as it would appear under decelerating conditions of the vehicle. If the vehicle were to be halted suddenly, the pallet 1 would shift forward to abut the pallet lock 3 at 51. Under most loaded conditions the center of gravity of the system would be at a point above the center of gravity of the pallet itself. Assuming this to be the case under high decelerating conditions, the cargo would tend to rotate in a clockwise direction as viewed in FIG. 4a. This clockwise motion would cause some part of the load transferring portion 40 of adapter 2 to contact and abut the tongued portion 8 of pallet lock 3. This would not only occur at the forward pallet lock, but also at a rear pallet lock (not shown). In other words, there would be a tendency at high decelerating conditions for the pallet and cargo to lift and abut the pallet locks at the top of load transferring portions 40. Thus, some of the high loads caused by the deceleration of the vehicle would be transferred from the track portion 20 of the pallet to portion 56 of the pallet. It should be noted that if load transferring portion 40 were not part of the adapter 2, that all the decelerating forces of the cargo would be transmitted into the track region of the pallet. Thus, by utilizing load transferring portion 40, it is possible to increase the load capabilities of a pallet system.

From the foregoing description, it is seen that such a system puts the loads of high decelerating conditions where it belongs, not in the track but into the vehicle or aircraft floor. Such a system also eliminates the edge cutouts of present high load systems which have a tendency to catch onto features in the vehicle during the maneuvering of the pallet into place between pallet locks.

It may be well understood that various minor modifications in design and/or location of the various components of this particular pallet restraining system may be made without diverting from the scope of the present invention. For example, there may be variations in the shape of the receptacle means 45 and of the stirrup 50 as was indicated hereinbefore. Also, the shapes and forms of the pallet as well as the pallet lock means may be varied from that as shown in the drawings.

I claim as my invention:

1. A cargo restraining system for holding down cargo to a pallet and to a vehicle floor which comprises in combination:
   a. a cargo pallet removably located on the floor, said cargo pallet having slotted connection means on the upper side and adjacent an edge portion thereof;
   b. pallet lock means connected to said floor having a projecting portion overlapping the edge adjacent said slotted connector means and spaced from the upper side of said cargo pallet for maintaining said pallet in place;
   c. cargo holding means around said cargo for confining said cargo on said pallet, said cargo holding means having attachment means connected thereto; and
   d. a tiedown adapter adjacent said pallet lock having;
      stud connector means sized to removably lock-fit within the slotted connection means of said pallet;
      a load transferring portion extending outwardly from the stud connector means between the space defined by the projecting portion of said pallet lock means and the upper side of said cargo pallet, and
      receptacle means for reception of the attachment means of said cargo holding means to thus hold the cargo onto said pallet whereby upon deceleration of said vehicle and resultant lifting of said pallet said tiedown adapter will transfer a portion of the cargo deceleration load away from said slotted connection means through said load transferring portion to said pallet lock means.

2. The cargo restraining system of claim 1 further characterized in that said slotted connection means comprises an elongated slotted track section, thus permitting said tiedown adapter to be disposed at various locations along the edge of said pallet.

3. The cargo restraining system of claim 1 further characterized in that said cargo pallet has slotted connector means on two opposing edge portions thereof and in that there is provided pallet lock means in conjunction with tiedown adapter and attachment means on each of said opposing edge portions.

4. The cargo restraining system of claim 1 further characterized in that said receptacle means of said tiedown adapter is of a hook-form and said attachment of said cargo holding means is a stirrup sized to removably fit within said hook-formed receptacle means to be secured in place.

* * * * *